(12) United States Patent
Marquant et al.

(10) Patent No.: US 7,848,429 B2
(45) Date of Patent: Dec. 7, 2010

(54) HIERARCHICAL CODING AND DECODING METHOD

(75) Inventors: Gwenaelle Marquant, La Chapelle Chaussee (FR); Guillaume Boisson, Rennes (FR); Jérome Vieron, Bedee (FR)

(73) Assignee: Thomson Licensing, Boulogne-Billancourt (FR)

( * ) Notice: Subject to any disclaimer, the term of this patent is extended or adjusted under 35 U.S.C. 154(b) by 1213 days.

(21) Appl. No.: 11/451,288

(22) Filed: Jun. 12, 2006

(65) Prior Publication Data

US 2006/0291564 A1  Dec. 28, 2006

(30) Foreign Application Priority Data

Jun. 23, 2005 (FR) .................................. 05 51734

(51) Int. Cl.
*H04N 7/12* (2006.01)
*H04B 1/66* (2006.01)

(52) U.S. Cl. .................................. 375/240.19
(58) Field of Classification Search ..............................
375/240.18–240.21, 240.24
See application file for complete search history.

(56) References Cited

U.S. PATENT DOCUMENTS

| 5,844,610 | A |   | 12/1998 | Perdrieau et al. |
| 5,898,798 | A | * | 4/1999 | Bouchard et al. ............ 382/242 |
| 5,909,518 | A | * | 6/1999 | Chui ........................... 382/277 |
| 6,091,777 | A | * | 7/2000 | Guetz et al. ............. 375/240.11 |
| 7,352,907 | B2 | * | 4/2008 | Sakuyama et al. .......... 382/240 |
| 2002/0057844 | A1 | * | 5/2002 | Sirohey et al. .............. 382/240 |
| 2004/0032968 | A1 |   | 2/2004 | Andrew et al. |
| 2004/0136602 | A1 |   | 7/2004 | Nagaraj et al. |

FOREIGN PATENT DOCUMENTS

| EP | 0664652 | 7/1995 |
| WO | WO97/15145 | 4/1997 |

OTHER PUBLICATIONS

Ngo C: "Image Resizing and Enhanced Digital Video Compression" EDN Electrical Design News, Reed Business Information, Highlands Ranch, Co, US vol. 41, No. 1 Jan. 4, 1996, pp. 145-148, 150, 15.
Search Report dated Feb. 9, 2006.

* cited by examiner

*Primary Examiner*—Nhon T Diep
(74) *Attorney, Agent, or Firm*—Robert D. Shedd; Paul P. Kiel; Guy H. Eriksen

(57) ABSTRACT

The method comprising a wavelet-based spatial analysis step comprising filtering operations of the picture at the high resolution format and horizontal and/or vertical decimation operations of the filtered picture to supply subband signals, is wherein a decimation operation is carried out according to a factor different from an even value and corresponds to the quotient of the horizontal and vertical dimensions of the first and second format such that the low frequency picture thus obtained relative to the low frequency subband signals, corresponds to the second format.

7 Claims, 2 Drawing Sheets

HIERARCHICAL CODING AND DECODING METHOD

This application claims the benefit, under 35 U.S.C. §119 of French Patent Application 0551734, filed Jun. 23, 2005.

FIELD OF THE INVENTION

The invention relates to a hierarchical coding and decoding method for video images of different non-proportional formats or proportional formats by a factor different from 2, in horizontal and/or vertical direction, more particularly a coding method by spatial analysis exploiting wavelet transformation or DWT the acronym for Discrete Wavelet Transformation. For example, this involves the coding of a digital television signal in SD format, for Standard Definition, and in the high definition HD format.

Description of the Prior Art

The scope is that of video compression based on spatial and/or temporal scalability diagrams also known as "scalables". This involves for example a 2D+t wavelet coding comprising a motion compensated temporal filtering. Hierarchical coding enables a base layer to be obtained, relative to the low resolution format, and upper layers that correspond to higher resolution formats.

The video coders with spatial scalability are in the known domain. The data flow generated by the video coder has a hierarchical structure enabling the necessary coded data to be transmitted or extracted in the single decoding format. The video formats involved by these coders are those for which the dimensions of the high resolution correspond to a multiple of 2 of those of the low resolution dimensions, enabling a dyadic decomposition. Thus, a coding method compatible with a QCIF format, for Quarter Common Intermediate Format, of dimensions 176×144 and with a CIF format of dimensions 352×288, or else a coding method compatible with a CIF format and a 4 CIF format of dimensions 704×576 is obtained by a spatial decomposition comprising high-pass and low-pass filtering and subsampling by two filtered pictures.

FIG. 1 shows a diagram of a video coder according to the prior art. As in most of the 2D+t subband coding diagrams, such as MC-EZBC, acronym for Motion Compensated Embedded Zero Block Context, the first step of the coding system consists of taking advantage of the temporal redundancy between successive images, before exploiting the spatial redundancy within an image.

The video signal is transmitted to a temporal analysis circuit 1. A motion estimation circuit 2 is connected to this first circuit to estimate the motion between two-images. The motion information is transmitted to the circuit 1 and to a coding circuit 6, for example in the form of motion vector fields. The output of circuit 1 is sent to a spatial analysis circuit 3 that performs a DWT wavelet transformation to supply data per subband. This data is then quantified and encoded according to an entropic coding method by a coder 4. This coding method can be of the VLC type, acronym for Variable Length Coding, or of the arithmetical type.

The coded information and motion information is sent to a packeting circuit or packetizer 5 that sends the video data in the form of video packets to constitute the video data flow.

The function of the packeting circuit is to cut up the texture and motion information coming respectively from the entropic coding circuit and the motion field coding circuit into consistent sub-sets according to their spatial and. temporal frequency and to their size, for example their weight in a bit plane coding approach. Hence, the binary flow obtained is scalable independently in resolution, field frequency and fidelity.

The estimated motion fields correspond to the resolution of the source or to the resolutions of the different temporal decomposition levels.

FIG. 2 shows in a summary manner the motion compensation temporal filtering operations, also known by the acronym MCTF, Motion Compensated Temporal Filtering, performed by the temporal analysis circuit 1. In this example, a 4-level decomposition is carried out for groups of pictures, also known as GOP or GOF, from Group Of Picture and Group Of Frames, comprising 16 pictures shown in thick lines.

The high frequency and low frequency filtering, renewed for each decomposition level, produces respectively 8 high temporal frequency images (t-H) and 8 low temporal frequency images (t-L) at the first temporal decomposition level. The low temporal frequency images are then decomposed again according to the same method. The high-pass filtering of these pictures supplies, at the higher temporal decomposition level, 4 high temporal frequency pictures t-LH and the low-pass filtering supplies 4 new low temporal frequency pictures t-LL. And so on, for the other levels. This decomposition thus enables a new distribution of the energy by generating a useful picture with a low temporal frequency t-LLLL, which represents an average of the set of the group of pictures and in which is concentrated the energy and four levels of pictures of low energy high temporal frequency pictures, namely 5 frequency bands. It is these 16 pictures that are sent to the spatial analysis circuit for spatial decomposition into subbands.

In one embodiment, instead of using a complex filtering operation exploiting a linear filter of a long length, the filtering is here carried out on a group of 16 pictures, a filtering known as "lifting" is implemented. This filtering method involves, in a known manner, of "factorising" the filter by using filters of a limited length, for example a filter of type 5/3 if it is chosen to filter the sample using a sliding window involving 5 successive samples.

The scalability enables a bitstream to be generated from which one can extract binary sub-streams adapted to sets of data such as flow, spatial resolution, temporal frequency, etc. In particular, from a coding threshold carried out at a given spatial resolution, the spatial scalability makes it possible to extract binary sub-streams, corresponding to lower spatial resolutions, from the resulting bitstream. For example, if the original scalable bitstream was generated from a 720×480 pixel resolution video sequence, a sub-bitstream, for example with a 360×240 pixel resolution, itself scalable, can be obtained after extracting the suitable data from this bitstream. The decoding of this sub-bitstream will generate a video of size 360×240 pixels.

This spatial scalability is obtained from the spatial analysis circuit 3 that carries out a subband cutting by wavelet transformation. For example, a subband decomposition at a single level of a signal 4 CIF supplies a lower frequency signal LL corresponding to the CIF format. If however, the high resolution format is not related to a low resolution format by a dyadic transformation, part of the picture in high resolution format or in a low resolution format is not used for the coding.

One purpose of the invention is to overcome the disadvantages described above.

SUMMARY OF THE INVENTION

The object of the invention is a method for the hierarchical coding of a video source picture according to different formats, at least one first picture format of high resolution and a second picture with a low resolution non-proportional format or proportional format by a factor different from 2, the method including a wavelet-based spatial analysis step comprising filtering operations of the picture at the high resolution format and horizontal and/or vertical decimation operations of the filtered picture to supply subband signals, wherein a decimation operation is carried out according to a factor different from an even value and corresponds to the quotient of the horizontal and vertical dimensions of the first and second format such that the low frequency picture thus obtained relative to the low frequency subband signals, corresponds to the second format.

According to a particular implementation, the method is wherein it comprises a preliminary temporal analysis step of the source picture to supply pictures of high and low temporal frequency and in that the spatial analysis step is carried out on the said temporal frequency pictures.

According to a particular implementation, the method is wherein the picture in high resolution format, is a low frequency picture obtained from dyadic wavelet transformation of the source picture.

According to a particular implementation, the first picture format corresponding to Y lines of X pixels and the second format to V lines of U pixels, the method is wherein a decimation operation is carried out according to the axis of the Xs of a value X/(X−U) or according to the axis of the Ys of a value Y/(Y−V) to supply high frequency subband signals (16, 17, 18).

The invention also relates to a method for decoding a video source picture from subband information relative to pictures in a first high resolution picture format and a second low resolution, non-proportional format or proportional format by a factor different from 2, the method comprising a wavelet-based spatial synthesis step comprising a horizontal and/or vertical oversampling operation of the low resolution picture obtained from subband signals, and filtering of the oversampled picture to supply the high resolution picture, wherein an oversampling operation is carried out according to a factor different from an even value and corresponds to the quotient of the horizontal and vertical dimensions of the first and second format.

According to a particular implementation, the method is wherein the low resolution picture corresponds to the low frequency subband signals of the high resolution picture.

According to a particular implementation, the method is wherein the lower resolution picture is obtained by spatial synthesis from the low and high frequency subband signals relating to this picture.

Owing to specific subsampling factors and to anisotropic filtering during the coding into wavelets, the sub-pictures obtained are adapted to the scalable coding formats, even if these formats cannot be deducted from each other by a dyadic transformation.

In exchange for a slight deformation of the image, all the information of the high resolution image is coded and therefore exploited for the display of a lower resolution image of non-homothetic dimensions.

BRIEF DESCRIPTION OF THE DRAWINGS

Other specific features and advantages will emerge clearly from the following description, the description provided as a non-restrictive example and referring to the annexed drawings wherein.

DETAILED DESCRIPTION OF THE PREFERRED EMBODIMENTS

Figure 1:
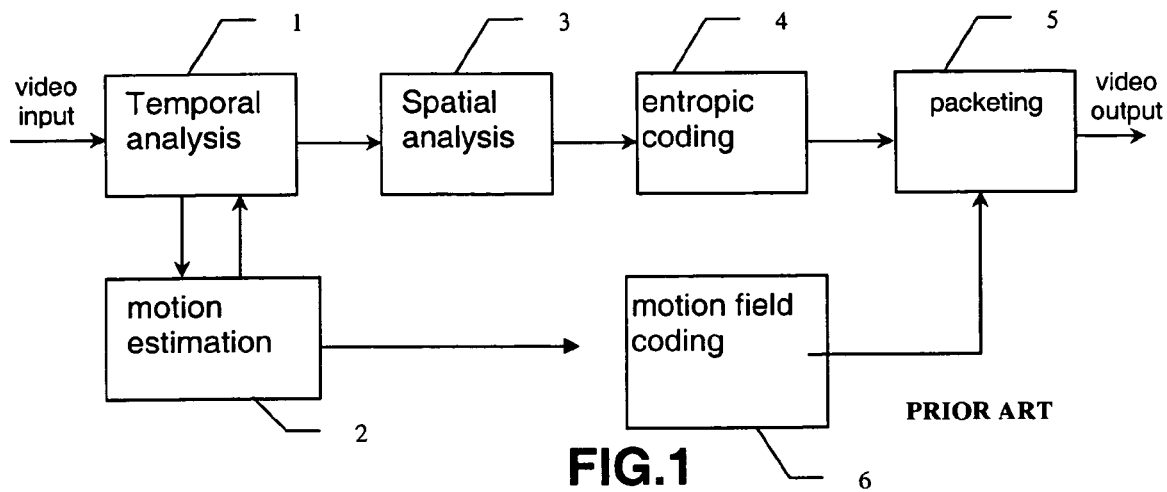
FIG. 1 a scalable coding diagram according to prior art,
FIG. 2, a temporal decomposition of a group of pictures,
FIG. 3, a spatial analysis according to the invention.
Figure 2:
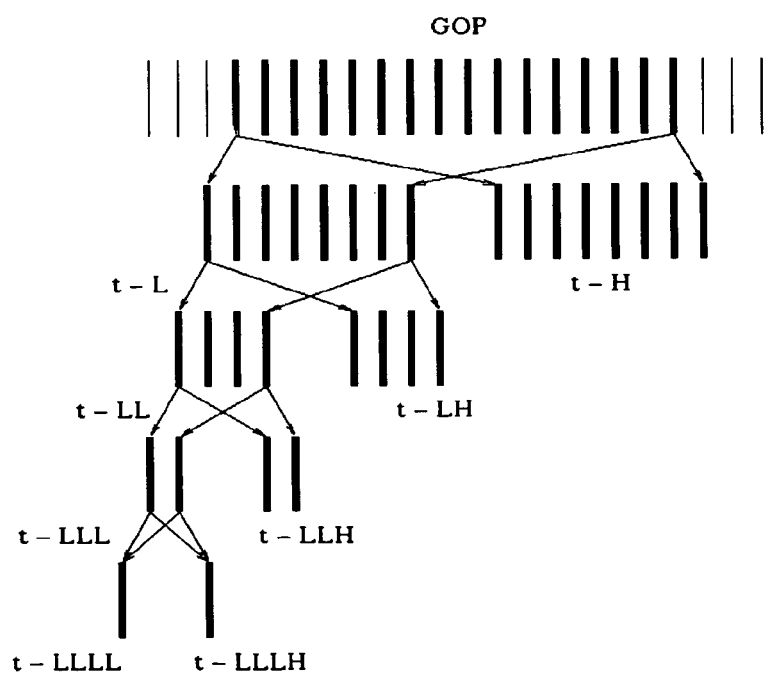
Figure 3:
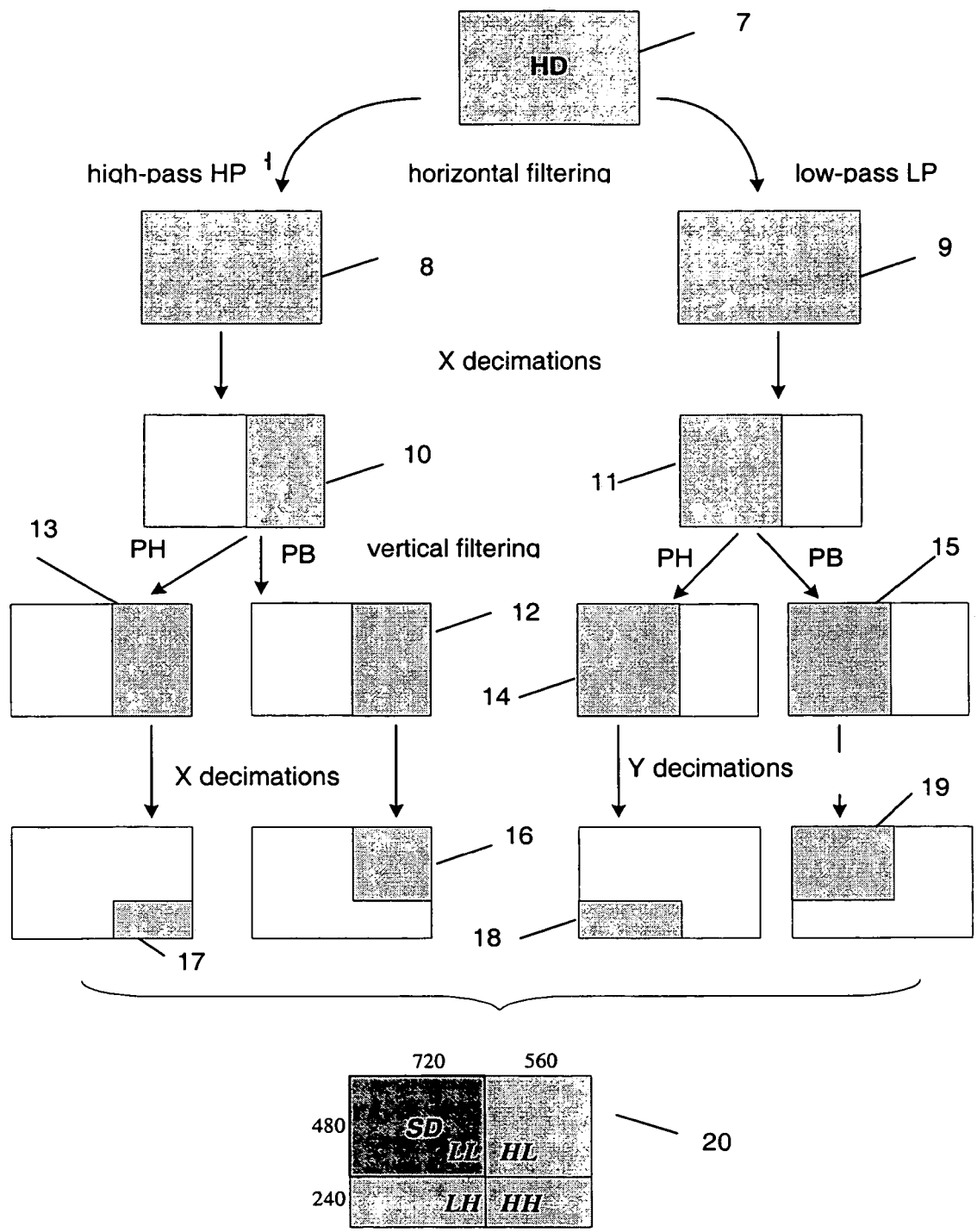

The spatial analysis circuit 3 according to the invention is described using FIG. 3. The different subband signals are obtained by high-pass and low-pas filtering of the picture. The filters are used to filter the image firstly on the lines then on the columns. The result is subsampled after each filtering operation. In this example, a single level of subband decomposition is realised corresponding to a high-pass and a low-pass filtering operation on the lines giving two filtered pictures and a high-pass and low-pass filtering operation on the columns for each of the filtered pictures. The picture formats to transmit by the coder are for example the HD format and the SD format.

A high resolution picture 7 in the HD standard of 720 lines of 1280 pixels, and corresponding to one of the high frequency image of a level of temporal decomposition (t-H, t-LH, t-LLH, t-LLLH) or to the low frequency image of the last level of temporal decomposition (t-LLLL) coming from the temporal analysis circuit 1 is decompressed in wavelets. Hence, a high-pass horizontal filtering and a low-pass horizontal filtering are carried out on this picture 7 to supply respectively a first and second filtered picture 8 and 9.

The filtered picture 9 is then decimated horizontally by a factor 1280/720 to supply a picture 11 of 720 lines of 720 pixels.

The filtered picture 8 is also decimated horizontally by a factor 1280/560 to supply a picture 10 of 720 lines of 560 pixels.

A high-pass vertical filtering and a low-pass vertical filtering operation are carried out on this picture 11 to supply respectively a first and second filtered picture 14 and 15.

The filtered picture 14 is then decimated vertically by a factor 720/240 to supply a picture 18 of 240 lines of 720 pixels.

The filtered picture 15 is also decimated vertically by a factor 720/480 to supply a picture 19 of 480 lines of 720 pixels.

A high-pass vertical filtering and a low-pass vertical filtering operation are carried out on this picture 10 to supply respectively a first and second filtered picture 13 and 12.

The filtered picture 13 is then decimated vertically by a factor 240/720 to supply a picture 17 of 240 lines of 560 pixels.

The filtered picture 12 is also decimated vertically by a factor 480/720 to supply a picture 16 of 480 lines of 560 pixels.

The picture 20 represents the different subband signals corresponding to the grouping of the sub-pictures obtained.

Hence, the wavelet decomposition method is adapted according to the scalable picture formats to be coded. From the highest resolution picture format, the spatial analysis method performs a horizontal decimation of the image obtained by horizontal low-pass filtering of a factor corresponding to the ratio of the horizontal dimension of the highest resolution format to that of the low resolution format. The subband picture thus obtained next undergoes a vertical low-pass filtering of a factor corresponding to the ratio of the vertical dimension of the highest resolution format to that of the low resolution format. The horizontal and vertical filtering order can be inverted.

This involves anisotropic filtering, the decimation operations having a different horizontal and vertical decimation ratio.

More generally, let us consider the coding of a source picture into a first high resolution format and of dimensions Y lines of X pixels and into at least one second low resolution format and of dimensions V pixels of U lines. U and/or V is lower respectively than X and/or Y.

The anisotropic filtering-calculates subband information during the different steps of filtering then decimation, such that the sub-picture relating to the subband low frequency corresponding to the low resolution format has the dimensions of this format. The complementary high frequency sub-pictures enabling the upper resolution level to code to be obtained have dimensions that are also complementary to those of the low frequency sub-picture to obtain the dimensions of this high resolution format.

Thus, a first horizontal decimation of a factor X/U is carried out on the picture in the first format filtered according to a low-pass filtering and a second vertical decimation of a factor Y/V is carried out on the picture thus decimated and having undergone a second low-pass filtering. The low frequency sub-picture obtained thus has a dimension of V lines of U columns corresponding to the second format.

Naturally, the first format can be the format of the source picture or else a format obtained after one or more dyadic wavelet transformations of the source picture. Likewise for the picture in the low resolution format.

The subband information additional to the low frequency subband information is obtained by applying additional decimations.

A first high frequency subband picture is obtained by applying a low-pass horizontal filtering on the picture in the first format, a horizontal decimation of a factor X/U, high-pass vertical filtering and a vertical decimation filtering of a factor Y/(V).

A second high frequency subband picture is obtained by applying a high-pass horizontal filtering on the picture in the first format, a horizontal decimation of a factor X/(X−U), a low-pass vertical filtering and a vertical decimation filtering of a factor Y/(Y−V).

A third high frequency subband picture is obtained by applying a low-pass horizontal filtering on the picture in the first format, a horizontal decimation of a factor X/(X−U), a high-pass vertical filtering and a vertical decimation filtering of a factor Y/(Y−V).

The invention also relates to a spatial synthesis method and a decoding device operating a spatial synthesis circuit that implements the method.

The method produces, from the subband or sub-picture signals selected from the flow of data corresponding to the format to decode, the stages of the coding operation in reverse order.

By taking the above example and by assuming that the decoding concerns the HD format, the subband signals processed are the sub-pictures LL corresponding to the SD format and the additional sub-pictures LH, HL and LL.

The oversampling operations are performed with the same factor as the one used for the encoding during the corresponding subsampling or decimation operations.

A vertical oversampling of a factor 720/480 is carried out on the LL signal to supply a subband picture of 720 lines of 720 pixels. A vertical oversampling of a factor 720/240 is also carried out on the LH signal to supply a subband picture of 720 lines of 720 pixels.

A vertical low-pass and high-pass filtering is then applied respectively on these two oversampled pictures LL and LH to provide a synthesis picture of 720 lines of 720 pixels. This picture is oversampled horizontally by a factor 1280/720 to provide a high frequency picture of 720 lines of 1280 pixels.

Likewise, a vertical oversampling of a factor 720/480 is carried out on the HL signal to supply a subband picture of 720 lines of 560 pixels. A vertical oversampling of a factor 720/240 is also carried out on the HH signal to supply a subband picture of 720 lines of 560 pixels.

A vertical low-pass and high-pass filtering is then applied respectively on these two oversampled pictures HL and HH to provide a synthesis image of 720 lines of 560 pixels. This picture is oversampled horizontally by a factor 1280/720 to provide a high frequency picture of 720 lines of 1280 pixels.

The high and low frequency pictures of 1720 lines of 1280 pixels are applied respectively to a high-pass synthesis filter and to a low-pass synthesis filter to give a high resolution image of 720 lines of 1280 pixels.

As above, the method can be generalised to a low resolution low frequency subband picture to obtain a decoded image of a higher resolution, the oversampling factors being those calculated previously for the decimation, the filtering and oversampling operations being carried out in reverse order to return a higher resolution picture, according to the example given above.

The low resolution picture corresponds to the low frequency subband signals relating to the high resolution picture. Where there are one or more than two resolution levels and if the low resolution picture considered is not the lowest resolution image, the low resolution image is then reconstructed from the subband signals relating to the lowest resolution picture and from high frequency subband signals of the intermediate resolution levels if they exist, which constitute as a whole the low frequency subband signals for this low resolution picture.

The coding and decoding process described above relates to two formats. It is naturally just as conceivable, without leaving the scope of the invention, to apply the different filtering and decimation steps to several picture formats not linked by dyadic transformations in such a manner that the low frequency subband signals, for the different levels of subband decomposition, correspond to sub-pictures with these formats.

The spatial analysis is carried out on the high and low frequency pictures from the temporal decomposition 1. It is naturally just as conceivable to exploit the spatial analysis method directly on source pictures or on pictures obtained after any type of temporal analysis.

The invention claimed is:

1. Method for the hierarchical coding of a video source picture according to different formats, at least one first high resolution picture format and a second non-proportional or proportional by a factor different from 2, low resolution picture format, the method comprising a wavelet-based spatial analysis step comprising filtering operations of the picture at the high resolution format and horizontal and/or vertical decimation operations of the filtered picture to supply subband signals, wherein a decimation operation is carried out according to a factor different from an even value and corresponds to the quotient of the horizontal or vertical dimensions of the first and second format such that the low frequency picture thus obtained relative to the low frequency subband signals, corresponds to the second format.

2. Method according to claim 1, comprising a preliminary temporal analysis step of the source picture to supply pictures of high and low temporal frequency and wherein the spatial analysis step is carried out on the said temporal frequency pictures.

3. Method according to claim 1, wherein the high resolution format picture and/or the low resolution format picture is a low frequency picture obtained from the dyadic wavelet transformation of the source picture.

4. Method according to claim 1, the first picture format corresponding to Y lines of X pixels and the second format to V lines of U pixels, wherein a decimation operation is carried out according to the axis of the Xs of a value X/(X−U) or according to the axis of the Ys of a value Y/(Y−V) to supply high frequency subband signals.

5. Method for decoding a video source picture from subband information relative to pictures in a first high resolution picture format and a second non-proportional or proportional by a factor different from 2, low resolution picture format, the method comprising a wavelet-based spatial synthesis step comprising a horizontal and/or vertical oversampling operation of the low resolution picture obtained from subband signals, and filtering of the oversampled picture to supply the high resolution picture, wherein an oversampling operation is carried out according to a factor different from an even value and corresponds to the quotient of the horizontal and vertical dimensions of the first and second format.

6. Decoding method according to claim 5, wherein the low resolution picture corresponds to the low frequency subband signals of the high resolution picture.

7. Decoding method according to claim 5, wherein the low resolution picture is obtained by spatial synthesis from the low and high frequency subband signals relating to this picture.

* * * * *